Oct. 11, 1932.  D. P. MOORE  1,882,084
ELECTRICAL SOUND TRACK RECORDER FOR MOVING PICTURE PRINTING MACHINES
Filed Dec. 17, 1929  2 Sheets-Sheet 1
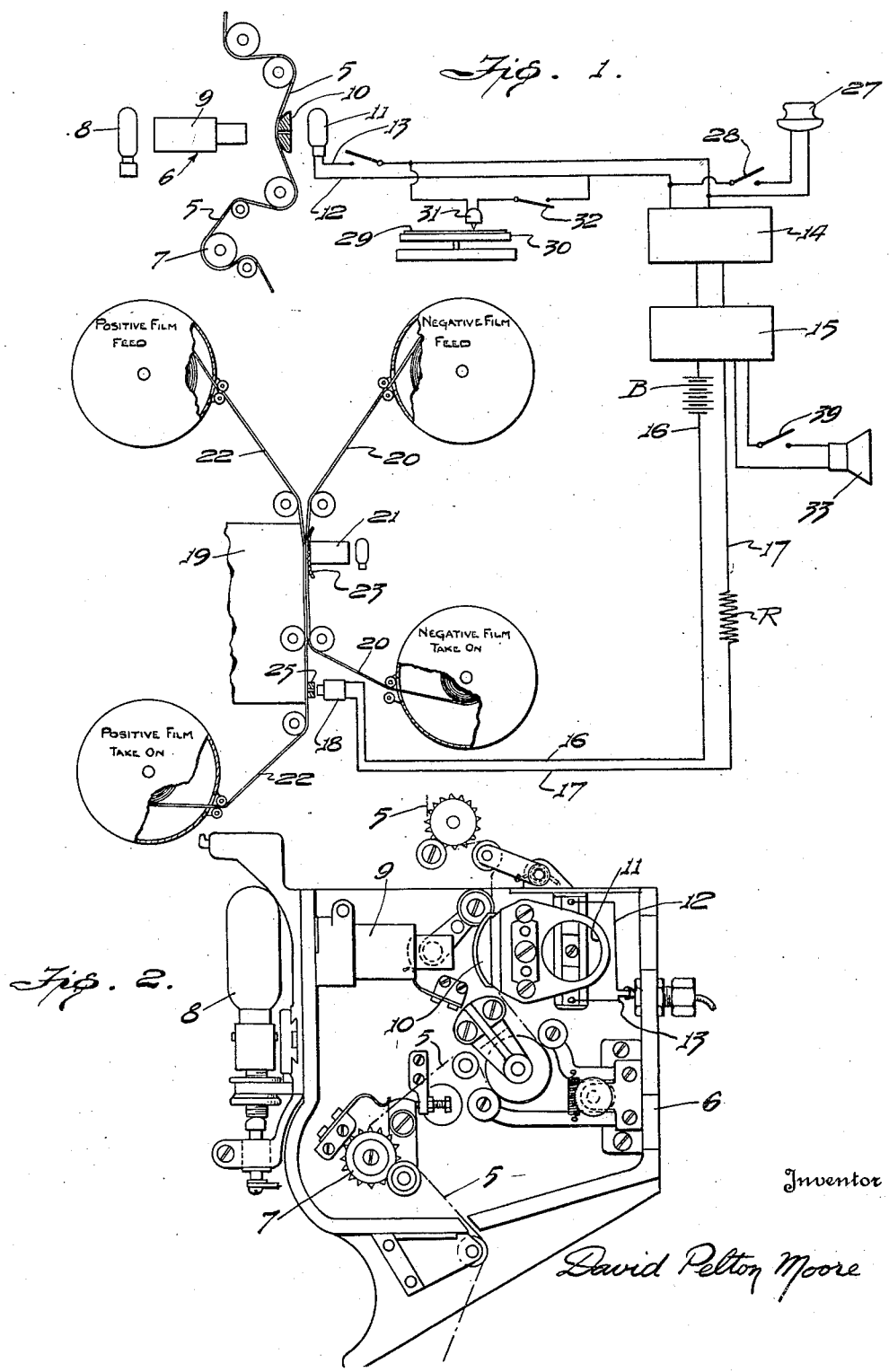

Oct. 11, 1932.  D. P. MOORE  1,882,084

ELECTRICAL SOUND TRACK RECORDER FOR MOVING PICTURE PRINTING MACHINES

Filed Dec. 17, 1929  2 Sheets-Sheet 2

Inventor

David Pelton Moore

Patented Oct. 11, 1932

1,882,084

UNITED STATES PATENT OFFICE

DAVID PELTON MOORE, OF AVON PARK, FLORIDA, ASSIGNOR TO MAX A. SCHLESINGER, OF NEW YORK, N. Y.

ELECTRICAL SOUND TRACK RECORDER FOR MOVING PICTURE PRINTING MACHINES

Application filed December 17, 1929. Serial No. 414,718.

The present invention relates to improvements in an attachment for electrically photographing or recording a sound track on a positive motion picture film simultaneously with the printing of the motion picture positive film, as contradistinguished from the camera photographing process, one object of the invention being the provision of an attachment by means of which a master photographic sound record, either a film or disc record, and/or sound from a microphone, controls in turn a photion lamp through an electrical amplifying system and a photo electric cell, impressing upon the sound track portion of a positive motion picture film during the scene printing of the same in a motion picture printing apparatus or machine of any well known type, it being possible with the present attachment to thus print electrically, musical or other sounds to produce what is known as a synchronized sound film.

Another object of this invention is the provision of a means whereby a photographic sound film progressing or advancing mechanism including an exciter lamp, an optical system, a slit block, and a photo electric cell are so combined and connected for synchronous operation with the film progressing or advancing mechanism and the motion picture film photographic printing machine that a photion lamp electrically connected to said photo electric cell is controlled to affect through a slit member carried by the printing machine to in turn impress upon the positive motion picture film a sound track photograph which when the printed film is developed, said film will contain both a positive scene and sound photograph, such performance being accomplished in a single operation, instead of in two operations, as is the present practice.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a diagrammatic view of the complete attachment in conjunction with a single positive film printer.

Figure 2 is a view of the sound film progressing or advancing mechanism showing particularly the photo electric cell and the circuit leads therefrom.

Figure 3:
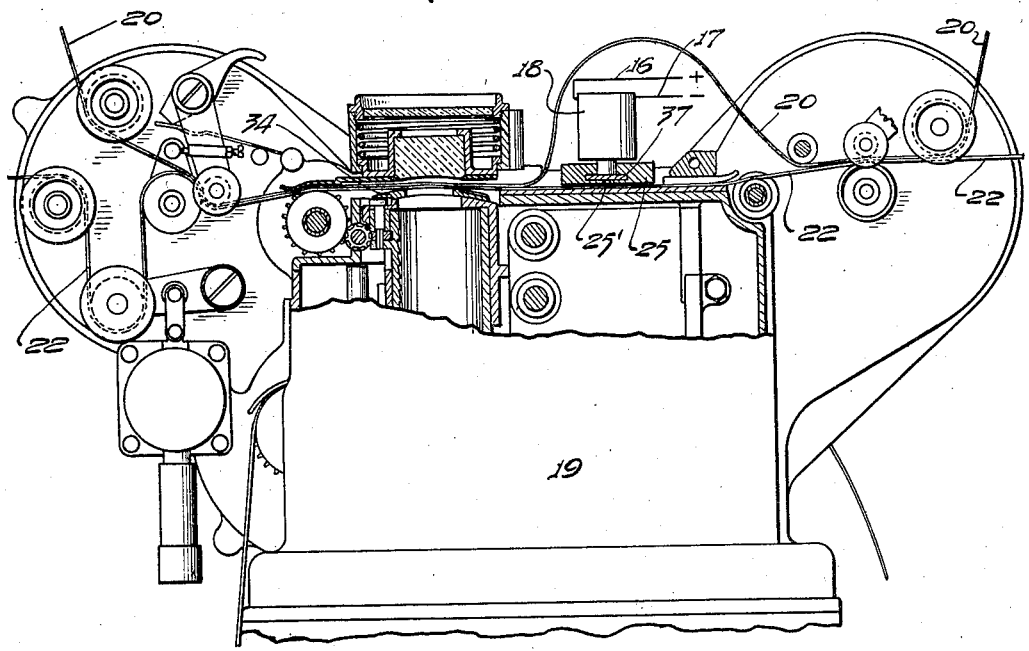
Figure 3 is a section through one unit of a multiple film printer having the present attachment applied thereto.
Figure 4:
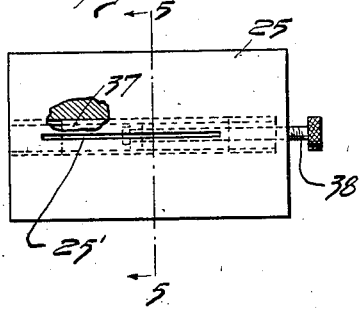
Figures 4 and 5 are detail views of the slit block employed with the photion lamp.
Figure 5:
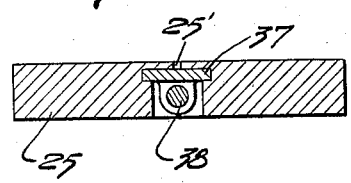

Referring to drawings, the numeral 5 designates a sound film which is the master film, and is mounted for movement through the film feeding machine 6, said machine having a film progressing or advancing mechanism 7, an exciter lamp 8, an optical system 9, a slit block 10, and a photo electric cell 11. Leading from the cell are two conductors 12 and 13 connected to a PEC amplifier 14, forming the first stage of amplification, and to this is connected in the usual manner the second stage amplifier 15, the conductors 16 and 17 leading from the amplifier 15 to the photion cell or lamp 18 mounted in, and the above described apparatus is an attachment to, a film printer 19, which may be of any well known type, as for instance the Bell & Howell printer. The negative film 20 in the printer is operated in the usual manner so as to be affected by the printing mechanism 21 and its adjustable light slit 23, to imprint upon the positive film 22 a scene photograph, the slot being made of sufficient length to affect only the scene area and leave a sound track space 24, which passes over the slit 25' of the slit block 25 adjacent the photion lamp 18. A transmission mechanism (not shown) connects the photographic printing mechanism of the printer 19 and the attachment so that both are operated in synchrony, the slit block 25 being positioned at the proper point so that it prints in advance on the film the proper distance ahead of the coordinated scene frame, so that a predetermined number of scene frames are interposed between the sound photograph, as is the present practice in producing sound on film motion picture films. Also connected to the conductors 12 and 13 is a microphone 27, by means of which, lectures may be photographed directly on the positive film, the machine 6 being idle and cut out by a switch 28, and in order that sound from a sound disc 29 of a phonograph 30 may be photographed upon the positive film, the machine 6 and microphone being then cut out, an electrical pick-up 31 is connected to the conductors 12 and 13, by a switch 32, or all or any combination of these elements may be used to produce the desired sound track.

Where so desired a loud speaker 33 with its cut out switch 39 is connected to the amplifier 15 and can be used as a monitor when the film 5 is being operated so that the person in charge of the printing apparatus may know that the photo electric cell is functioning properly.

By means of the electrical circuits here shown, a positive film may be reproduced as a positive upon the film in the printer, or the sound photographed directly from the microphone impressions are photographed and printed as positives. This is accomplished by the use of a change of phase in the output to the photion lamp.

It is also possible by this invention to add to an already sound and scene film, additional sounds, such as accompanying innuendo music and/or talk, either by the formation of an additional sound track or all sounds may be recorded on one sound track.

It is also possible to use the present invention with the film printer as shown and described in United States Letters Patent No. 1,725,944, and as illustrated in Figure 3, and in which a single negative film is employed, and from which a multiplicity of positive prints can be produced, except in the present instance, the films have imparted thereto a steady advancing instead of an intermittent movement. In this event a similar number of photion lamps, one to each positive printer unit is employed, and the photion lamp is placed to the right of the aperture plate 34, a sufficient distance to allow for the framing of the coordinated picture, consequently, the casing of each printer is wider than as shown in the above Letters Patent, but only when the positive film is passed and adjacent the upper side so that the sensitized side of the film is nearer the lamp.

In all cases the slit for printing the sound striations on the film, is as shown in Figure 3, where a strip 37 is adjustable to regulate the opening of the slit at either end, by means of the adjusting screw 38, and by this means, the usual sound track can be formed with the strip adjusted as shown, or when extraneous sounds, or innuendo sounds, or in fact any desired accompaniment may be produced exterior of the sprocket holes, or the strip 37 may be used as a type to be taken out and inserted to produce a slit at any point desired.

It is the intention to cover attachments for film printers whereby direct electrical recording by light controlled means on a moving picture film is done during the film printing operation.

It is preferable to employ a negative print film for the sound master film, but by the phasing of the output to the photion lamp, it is possible to use a positive print film and reproduce on the final positive scene and sound print, a positive sound print, thereby imparting to the finished positive print film, the best that can be possibly obtained to produce the best results in the final presentation of the scene and sound for entertainment, advertising, and/or educational purposes.

Instead of the photion lamp, a Kerr cell, a light valve or in fact, any lamp that will efficiently produce the desired striation on the printed film, may be used, and where the words "photion lamp" are used in the description and claims, this broad interpretation is intended. A battery B and a resistance R are placed in the respective conductors 16 and 17 between the photion lamp 18 and the amplifier 15. By means of the battery B the D. C. component of the photion lamp is obtained, and in view of the fact that the photion lamp is preferably a gaseous tube, it possesses a negative resistance characteristic and therefore requires that a positive resistance R be connected in the circuit, the A. C. component of the photion lamp being obtained from the amplifier.

As both positive and negative films gain the same reaction to light, the difference, it is evident that a record can be made on a positive film directly projected from a positive film, the latter being preferable as it permits of a longer printing operation than a negative film.

From the foregoing description taken in connection with the drawings, it is evident that with an attachment of this character, negatives of well known and practically discarded silent pictures or new silent pictures of a foreign type may be sound synchronized, that is, through the sound film, which has been previously made under ideal conditions and disposed so as to act upon a predetermined length of film to be in proper accord with the similar length of the scene negative may be used to advantage and thus synchronized sound can in a practical and thorough manner be made a part of such positive film to bring the same up to date and render it useful in entertainment.

What is claimed is:

1. An attachment for moving picture photographic printing machines including a sound track light exposure point disposed to affect only the moving positive film, variable light furnishing means adjacent said point, an amplifying system the output of which is connected to said light furnishing means, and means for impressing electrical fluctuations upon the input of the amplifying system by and in accordance with the sound to be impressed photographically through the light to form a sound track on a positive film.

2. The combination as claimed in claim 1, wherein the last named means includes a sound-on-film controlled photo electric cell, a microphone, a phonic groove controlled electrical pick-up, and selective means for connecting one and any combination thereof to the input of the amplifying system.

3. The combination as claimed in claim 1, wherein the last named means includes a sound-on-film mechanism having an exciter lamp, means for continuously progressing a film having a photographic sound track thereon past said lamp, a photo electric cell disposed to be influenced by the light rays from the lamp after projection through the sound track of the moving film, and a photo electric cell amplifier connected at its input to the cell and having its output connected to the input of the amplifying system, a microphone, an electrical stylus pick-up, and selective means for connecting the photoelectric cell, the microphone and the pick-up simultaneously or separately for recording.

4. The combination as claimed in claim 1, wherein the variable light furnishing means is a photion tube.

5. An attachment for moving picture photographic printing machines including a slit member disposed adjacent the positive film support and past which only the positive film moves, an electric lamp adjacent said slit of the member and through which light rays from the lamp are directed upon the sound track of the positive film, an amplifying system the output of which is connected to the lamp, a sound-on-film controlled photoelectric cell, a microphone, an electrical pick-up, and selective means for connecting either one thereof or any combination thereof to the input of the amplifying system.

6. The combination as claimed in claim 5, wherein the sound-on-film photoelectric cell mechanism means includes a sound-on-film mechanism having means for continuously progressing a film to have formed thereon photographically a sound track, a photo electric cell, an exciter lamp and optical system, and a photo electric cell amplifier connected at its input to the cell and by its output to the input of the amplifying system.

7. An attachment for moving picture photographic printing machines including in combination means for electrically recording a sound track photograph upon the moving positive film simultaneously with the picture printing operation, said means including a sound recording unit including an electric lamp and a slit both of which are disposed adjacent only the positive film, an amplifying system the output of which is connected to said lamp, and sound wave controlled means connected to the input of the amplifying system and through which the lamp is affected.

8. An attachment as claimed in claim 7, wherein the sound wave controlled means includes a photo electric cell and its amplifier, a microphone, an electrical pick-up, and selective means for connecting either the cell, microphone or the pick-up or any combination thereof to the input of the amplifying system.

9. A sound track printing attachment for moving picture printing machines, including a sound reproducing unit including a light source, a photoelectric cell and an amplifier for the output of said cell, means for moving a film carrying a photographic sound record in operative relation to said light source and said cell, a sound recording unit including an electric lamp and a slit, said amplifier being in circuit with said lamp, and said slit being adjacent the motion picture positive film in the printing machine, a microphone and a stylus controlled electrical pickup for affecting the lamp, and selective means for connecting either the cell, microphone or the pickup, or any combination thereof to the input of the amplifier.

In testimony whereof, I affix my signature.

DAVID PELTON MOORE.